(12) United States Patent
Viaud

(10) Patent No.: US 6,796,109 B2
(45) Date of Patent: Sep. 28, 2004

(54) LARGE ROUND BALER

(75) Inventor: Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/377,961

(22) Filed: Feb. 28, 2003

(65) Prior Publication Data

US 2003/0172629 A1 Sep. 18, 2003

(30) Foreign Application Priority Data

Mar. 15, 2002 (DE) .......................................... 102 11 412

(51) Int. Cl.⁷ .............................................. B65B 11/04
(52) U.S. Cl. ........................ 53/587; 53/118; 53/389.3; 53/389.4
(58) Field of Search .................... 53/118, 211, 215, 53/389.3, 389.4, 430, 465, 587; 226/195; 242/419

(56) References Cited

U.S. PATENT DOCUMENTS

| | | | | |
|---|---|---|---|---|
| 4,409,784 A | * | 10/1983 | VanGinhoven et al. | 53/587 |
| 4,686,812 A | * | 8/1987 | Bruer et al. | 53/587 |
| 4,703,605 A | * | 11/1987 | Ackermann | 53/587 |
| 5,243,806 A | * | 9/1993 | Jennings et al. | 53/587 |
| 5,247,775 A | * | 9/1993 | Viaud | 53/587 |
| 5,568,716 A | | 10/1996 | Kluver et al. | 53/399 |
| 5,581,973 A | | 12/1996 | Underhill | 53/118 |
| 5,974,764 A | | 11/1999 | Anstey et al. | 53/118 |
| 6,006,504 A | | 12/1999 | Myers et al. | 53/556 |
| 6,029,420 A | | 2/2000 | Tertilt et al. | 53/118 |
| 6,073,433 A | * | 6/2000 | Roth | 53/587 |
| 6,272,816 B1 | | 8/2001 | Viaud et al. | 53/587 |
| 6,550,218 B2 | * | 4/2003 | McClure et al. | 53/587 |
| 6,606,843 B1 | * | 8/2003 | Anstey et al. | 53/587 |

FOREIGN PATENT DOCUMENTS

| | | |
|---|---|---|
| DE | 33 30 757 | 2/1975 |
| DE | 34 18 681 A1 | 11/1985 |
| DE | 195 30 530 A1 | 2/1997 |
| EP | 09 41 651 | 9/1999 |
| EP | 1 142 469 A1 | 3/2001 |
| EP | 1 157 603 A1 | 4/2001 |
| WO | WO 97/05767 | 2/1997 |

* cited by examiner

Primary Examiner—Louis Huynh

(57) ABSTRACT

A large round baler is provided with a wrapping arrangement which supplies wrapping material to a baling chamber inlet at a location above the floor of a baling chamber. The wrapping arrangement includes a wrapping material supply roll positioned at, or in frictional contact with, a feed roll, which conveys the wrapping material and delivers it such that it gravitates downwardly through a gap provided between an anvil and movable part of a cut-off device, the cut-off device being located at the inlet to the baling chamber so that the gravitating material passes into the baling chamber where it is caught between the formed bale and a rotatable bale-forming device which delimits at least a portion of the circumference of the baling chamber.

14 Claims, 11 Drawing Sheets

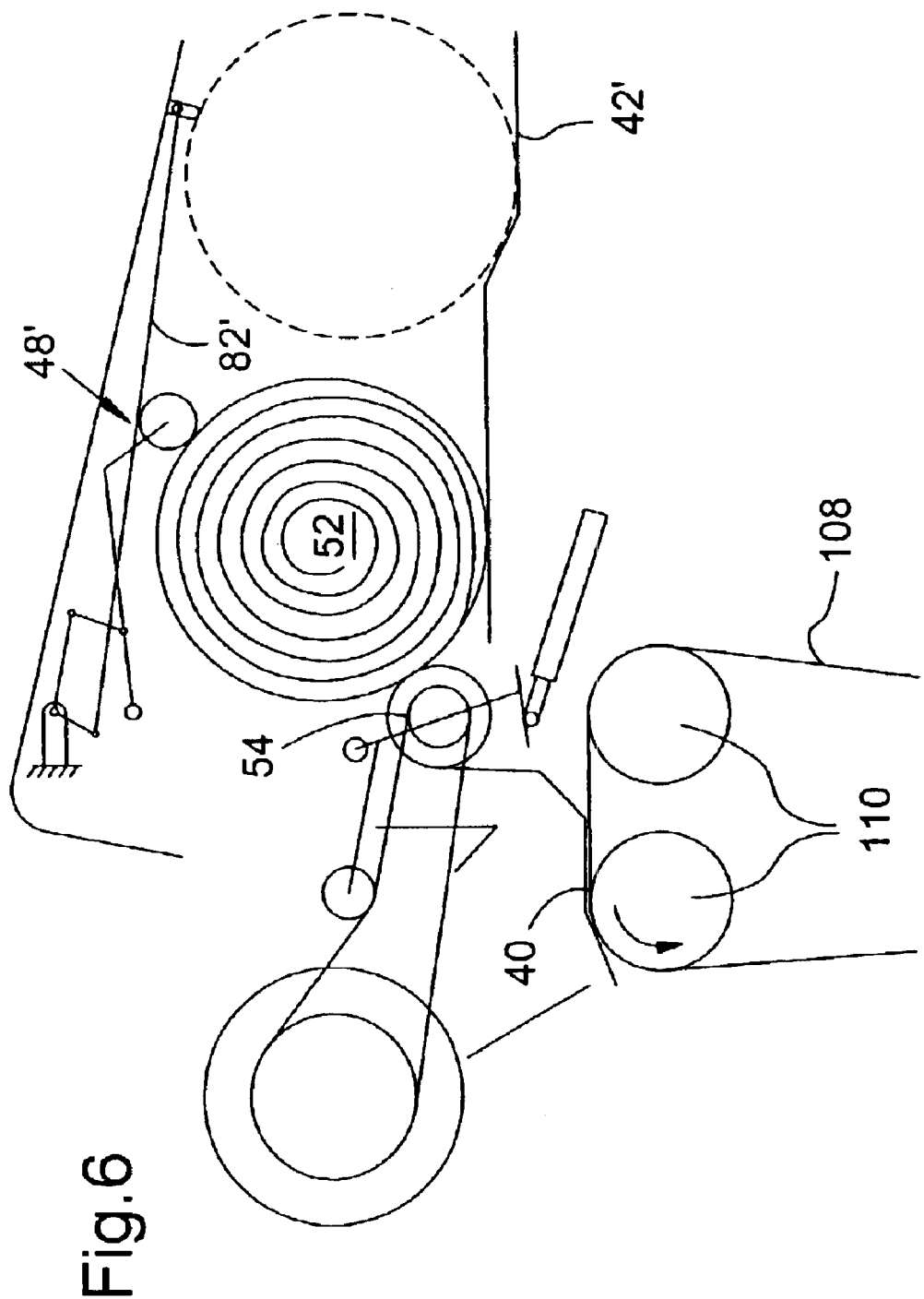

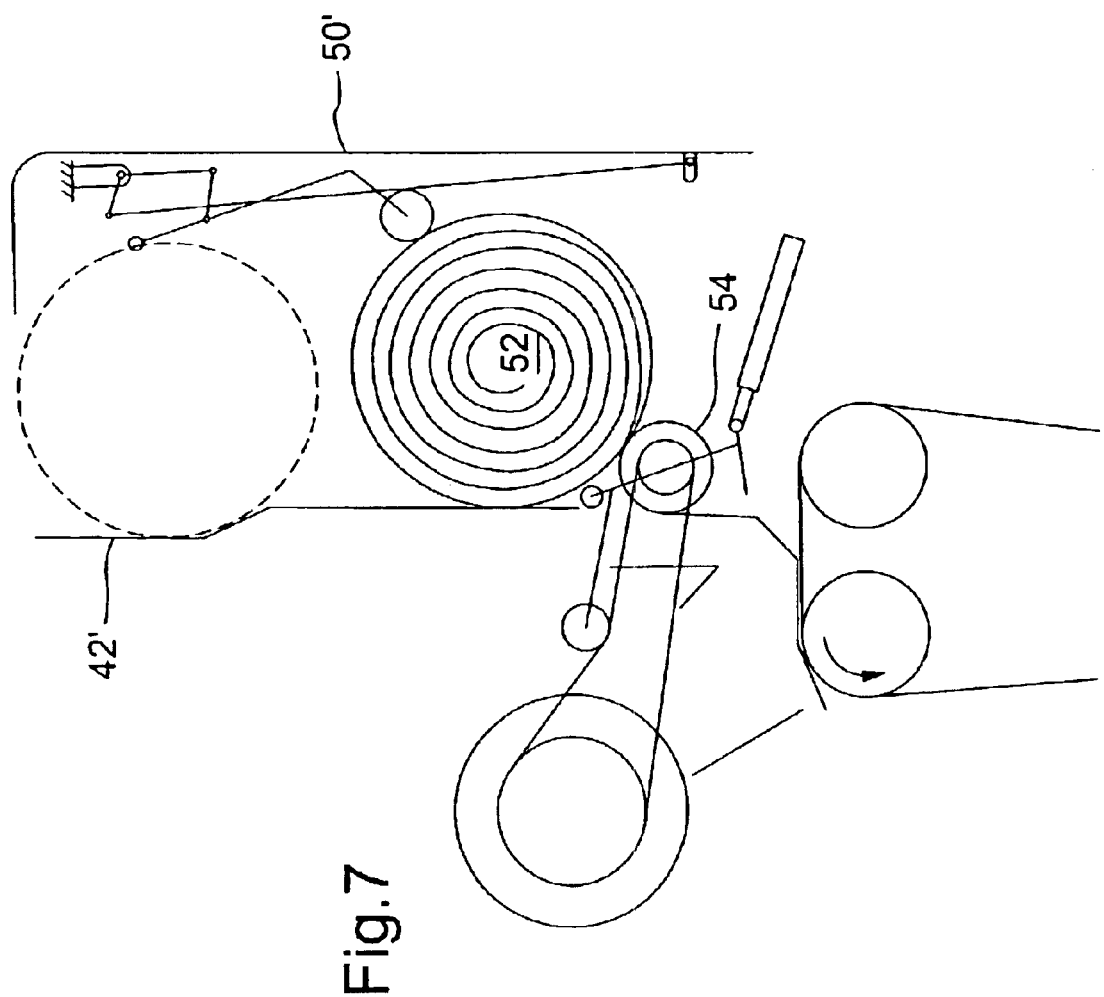

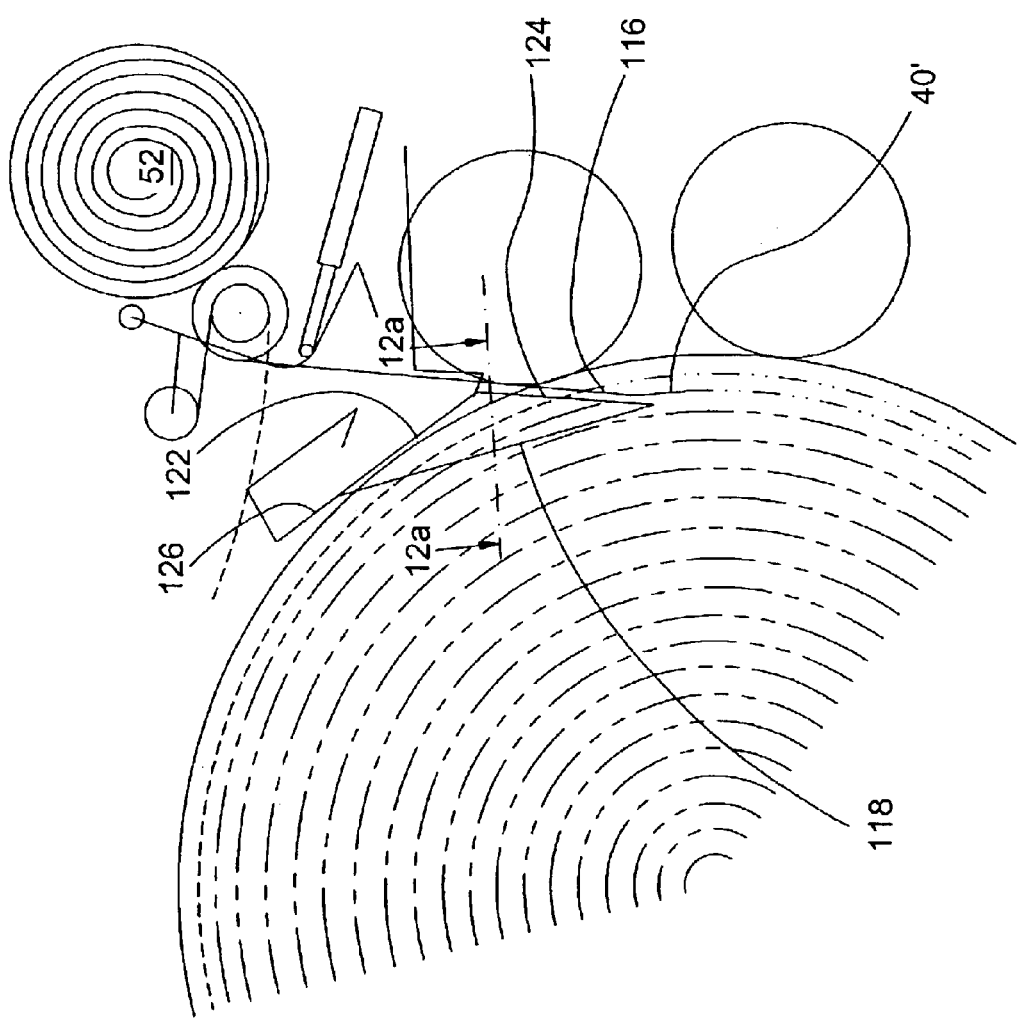
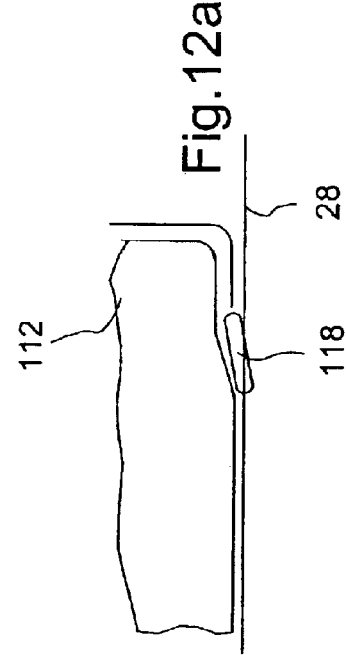
Fig.12
Fig.12a

LARGE ROUND BALER

FIELD OF THE INVENTION

The invention concerns a large round baler with a baling chamber, at least one bale-forming device surrounding the baling chamber around its circumference, a wrapping arrangement and a wrapping material inlet opening in the enclosure of the baling chamber extending through the bale-forming device above the floor of the baling chamber.

BACKGROUND OF THE INVENTION

A large round baler is known from U.S. Pat. No. 5,581, 973 in whose forward region a wrapping arrangement is provided with which, for example, a net drawn from a roll can be introduced between a bale-forming roll and a deflecting roll into a baling chamber by means of a supply arrangement. The supply arrangement contains jaws that can be repositioned by a motor into which the wrapping material is clamped and on whose forward side a remaining piece hangs, that can be brought into engagement with the bale formed in the baling chamber and rotated there. The supply arrangement represents a considerable construction cost.

DE-A-34 18 681 also shows a large round baler with a wrapping arrangement attached to its forward side in which a wrapping material roll is accommodated in the forward upper corner region and two supply rolls are located between two bale-forming rolls that draw the wrapping material between them and conduct it to the baling chamber. A sharply inclined guide vane extends between the wrapping material roll and the supply rolls. These supply rolls also lead to a considerable construction cost.

According to WO-A-97/05767 a wrapping material roll is moved vertically in order to come into contact with the rotating bale which grasps and carries along the wrapping material that is also conveyed by a guide vane. The wrapping material is conducted together with the crop to be baled through a slot at the floor of the baling chamber and is inserted in this way between two layers of crop to be baled, which however, reduces the retaining force of adjoining net layers.

According to U.S. Pat. No. 5,974,764 a wrapping material roll rests on an upper of two supply or feed rolls, is brought into rotation by these during the wrapping process, and is braked relative to the rotating bale. The wrapping material is drawn between the two supply rolls and conducted to a carry-along arrangement that delivers it to an inlet opening provided at the floor of the baling chamber for the harvested crop. The supply rolls and the carry-along arrangement represent a considerable construction cost.

The problem underlying the invention is seen in the need to propose a wrapping arrangement that provides a reliable supply of wrapping material with low construction cost and construction space.

SUMMARY OF THE INVENTION

According to the present invention, there is provided an improved wrapping arrangement for delivering wrapping material into a baling chamber.

An object of the invention is to provide a wrapping arrangement which reliably delivers wrapping material to a baling chamber and is of a compact, low cost construction.

A more specific object of the invention is to provide a wrapping arrangement which includes a selectively driven roll located at an inlet for introducing wrapping material into the baling chamber, with a wrapping material supply roll being mounted for movement into engagement with the driven roll, so as to cause the wrapping material to unwrap from the supply roll and gravitate through the inlet.

In this way, no additional conveying or supply arrangement for the wrapping material is required; rather, it falls under the force of gravity into the baling chamber that is located at least partially underneath it. Two supply rolls are not required, since the wrapping material is in contact with the one supply roll, and it is carried along on the basis of this contact. The wrapping arrangement may be arranged at the forward side as well as the rear side of the large round baler, which depends on the direction of rotation of the bale or of the bale-forming device. The bale-forming device can be formed by a single wide band, by a multitude of belts, or if necessary, several sets of belts, by a bar chain conveyor or by a combination of these. Since the wrapping material inlet opening, the roll, and the wrapping material roll follow each other closely, the result is a compact configuration.

The construction arrangement can be configured with even less construction cost and space if the roll conveying the wrapping material is simultaneously a part of the bale-forming device. For example, a bale-forming roll or one or more belts draws or draw the wrapping material into the baling chamber. In this embodiment, the tension of the wrapping material upon the bale is applied by a separate brake that acts, for example, on the wrapping material roll, and if necessary, is controlled so that the wrapping material can be easily grasped by the bale and carried along at the beginning of the wrapping process. Since the carrier is adjustable, the wrapping material can be brought into contact with the bale-forming device that otherwise is still rotating only if a wrapping process is actually to be performed.

Alternatively, the roll is separated from the bale-forming device, always remains in its position, and is only driven during the wrapping operation. While it would be possible to drive the roll, for example, with an electric or hydraulic motor, since the bale-forming device or devices are driven anyway during the wrapping process, a simplification of the construction can then occur if the drive of the roll is taken from the bale-forming device. The drive so derived is then preferably geared down, so that to maintain the tension in the wrapping material, the bale rotates more rapidly than the supply of the wrapping material.

It is possible to brake the wrapping material roll in a known manner with a brake acting upon the core of the roll. It is technically simpler, however, to let the wrapping material roll with its weight rest upon a carrier, be in contact with a wall or the like. The carrier and/or the wall may be provided with a high-friction coating or a profile in order to increase the braking force.

Although the wrapping material reaches directly into the baling chamber on the basis of its own weight, the kinetic energy of the roll, however, could initially bring the wrapping material into an undesirable track. With a guide vane—straight or curved—the wrapping material is conducted directly and safely into the wrapping material inlet opening. In place of a sheet metal guide vane, plastic or wood, or the like could also be used.

Although it has variously been proposed to make wrapping material available in pre-cut lengths, it is nevertheless considerably more effective to withdraw wrapping material for a multitude of bales from a wrapping material roll and to cut it by means of a corresponding arrangement according to the demand. Such a cutting arrangement is advantageous particularly for large round balers with a variable baling chamber since the demand there for wrapping material varies with the size of the bale.

A pressure roll loaded by a force that generally engages the wrapping material roll diametrically opposite the roll, has the result on the one hand that a certain tension is built up in the wrapping material, and on the other hand, a durable contact of the wrapping material roll on the roll is provided, particularly during rough operation on a field.

In any case, when the roll is enclosed by the wrapping material for approximately half of its circumference, the frictional force between the two is normally large enough to assure conveying on the one hand and a tension on the other hand.

A covering has the advantage that the wrapping arrangement is protected as much as possible from environmental hazards. If in addition, the pressure roll or a contact force arrangement is attached to the covering and can be repositioned together with it, the path for the exchange of a wrapping material roll can be opened simultaneously when the covering is raised or pivoted away.

A stable bearing support for the wrapping material roll can be attained easily by the provision of a contact force arrangement that acts upon the pressure roll that is in contact with the wrapping material roll on the one hand, and that is supported on the other hand, on the covering. The loading, that is, the dimensioning of the force applied to the force member, can be controlled. The force member can be loaded, for example, by a gas spring, a compression spring or extension spring, or the like.

If the force member crosses a dead center position, it can, on the one hand, thereby bring the covering into the closed position and the pressure roll in the contact force position, and on the other, hand bring both into the open position or the raised position where the position is taken up by the force stored in the force member.

If the wrapping arrangement is configured wider than the baling chamber and guide vanes or slots are provided downstream of the roll, in order to guide the wrapping material to the end faces of a bale being formed in the baling chamber, if necessary, by means of a spreader arrangement, then the bale is covered not only on its circumference, but also over its edges and partially on its end faces. In a bale formed of silage, the influence of air is thereby reduced, among other factors, whereby the quality of forage is improved.

The use of a deflector creates a free space between the bale and the side wall, into which the region of the wrapping material can escape that is to be applied later to the end faces. This deflector may be a simple plate, a shape applied to the side wall, or the like, that extends radially by at least the thickness of the wrapping material from the side wall to the interior.

The advantage of a deflector spaced away from the side wall lies in the fact that the wrapping material can be applied before its entry into the baling chamber and is carried along by the bale without any problems.

BRIEF DESCRIPTION OF THE DRAWINGS

The drawing shows several embodiments of the invention that shall be described in greater detail in the following.

FIG. 6 shows a wrapping arrangement, constructed according to a sixth embodiment, including a possible support arrangement for two wrapping material rolls in an essentially horizontal disposition.

FIG. 7 shows a wrapping arrangement, constructed according to a seventh embodiment, including a possible support arrangement for two wrapping material rolls located one above the other.

FIG. 12 is a side view of the wrapping arrangement according to FIG. 1 constructed for delivering a wrapping material that is wider than the bale produced by the large round baler and including a deflector.

FIG. 12a is a plan view of a cross section through the side wall in the region of the deflector shown in FIG. 12.

DESCRIPTION OF THE PREFERRED EMBODIMENT

Figure 1:
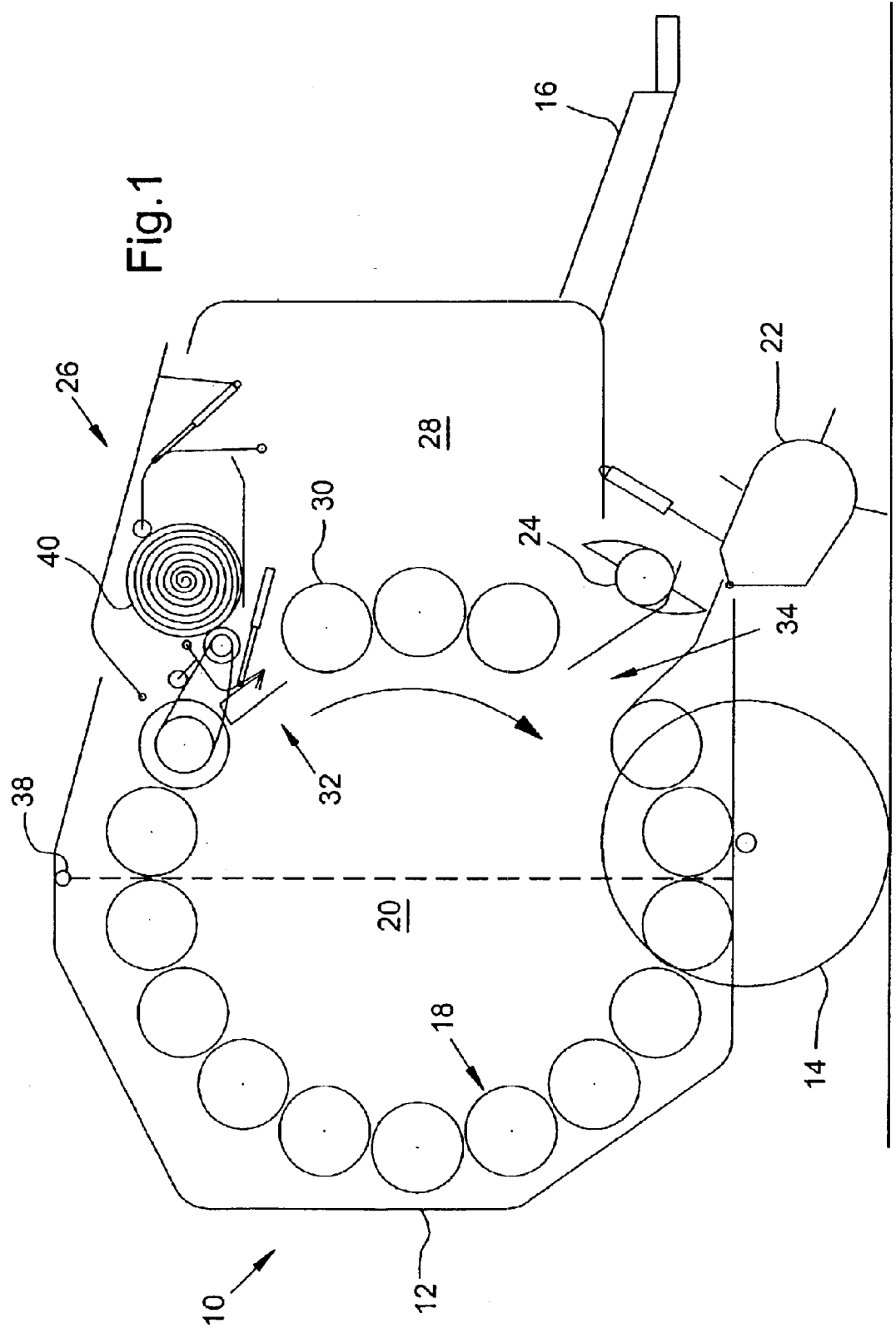
FIG. 1 is a schematic right side view of a large round baler equipped with a wrapping arrangement, constructed according to a first embodiment, an shown in an operating position.

A large round baler 10, shown schematically in FIG. 1, includes, among other items, a chassis 12, wheels 14, a towbar 16, bale-forming devices 18, a baling chamber 20, a crop pick-up arrangement 22, a conveyor 24, and a wrapping arrangement 26.

The large round baler 10 is used to take up harvested crop lying on the ground and form the crop into a bale, particularly a cylindrical bale, as is known in itself. Indeed, it can also be used to bale commercial goods, such as cloth, garbage, foil, etc.

The chassis 12 is formed by a bolted and/or welded assembly, not shown, at whose underside an axle, not shown, is located that accepts the wheels 14. A towbar 16 is connected to the front of, and side walls 28 are carried at opposite sides of, the chassis 12.

The wheels 14 support the large round baler on the ground and its movement, particularly over a field, on which the crop to be baled has been deposited.

With the towbar 16, the large round baler 10 can be coupled to a towing vehicle, not shown, for example, an agricultural tractor.

In the following, the term "bale-forming device" 18 is used as an overall concept for all conceivable configurations, in single or multiple units. In this embodiment, the bale-forming device 18 is configured as a multitude of bale-forming rolls 30, whose axes of rotation extend parallel to each other and are located on a circle arc.

Figure 2:
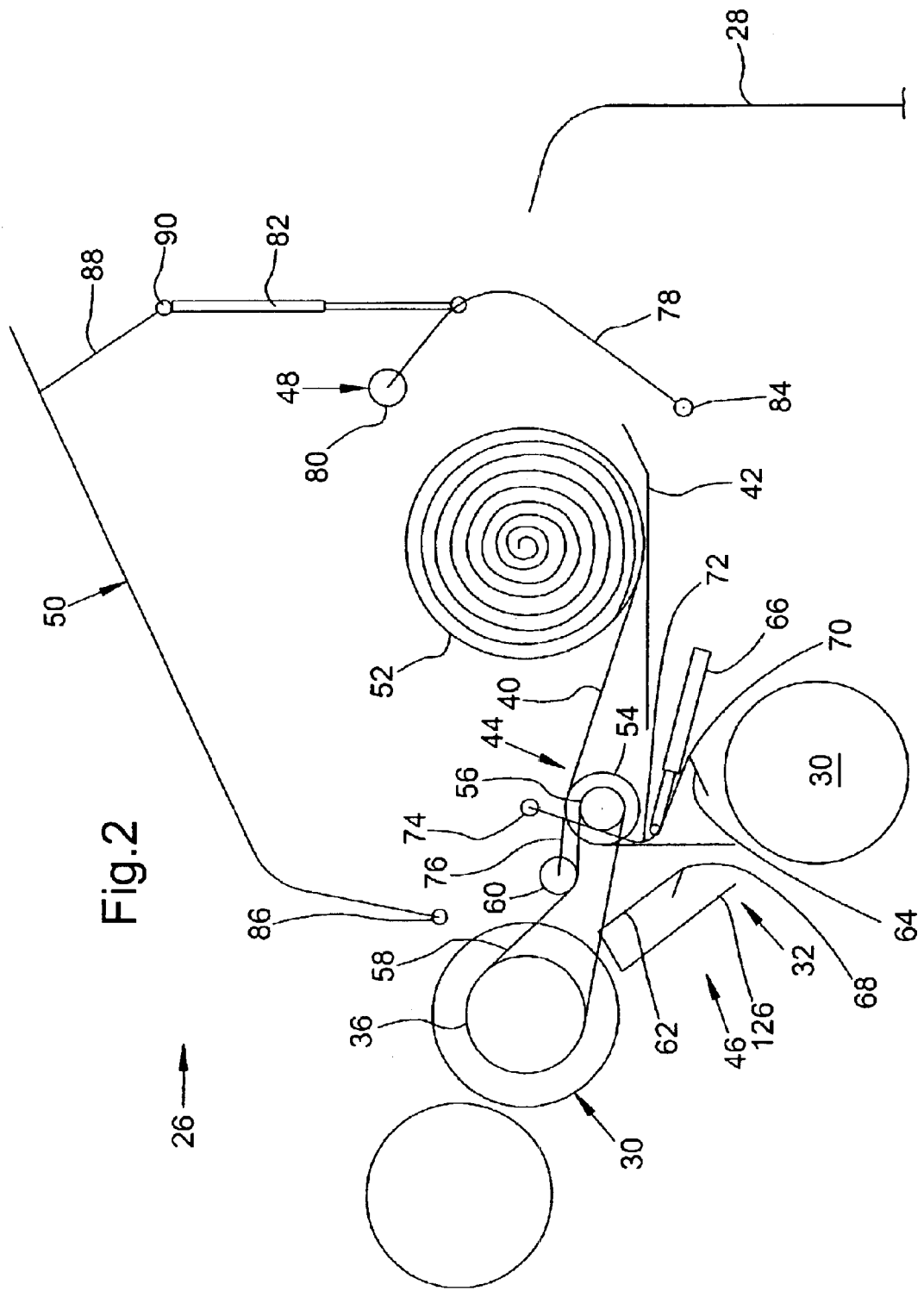
FIG. 2 shows the wrapping arrangement of FIG. 1 in an enlarged view with a cutting arrangement and in a charging condition.

Except for a wrapping material inlet opening 32 and a harvested crop inlet opening 34, the bale-forming rolls 30 enclose the baling chamber 20 on its circumference substantially completely. As seen in FIG. 1, and with reference to the hands of a clock, the wrapping material inlet opening 32 is located approximately at a 1:30 o'clock position and the harvested crop inlet opening 34 at a 4:30 o'clock position. As seen in the circumferential direction, the width of the wrapping material inlet opening 32 corresponds approximately to the diameter of a bale-forming roll 30 and the width of the harvested crop inlet opening 34 approximately to that of one-and-one-half bale-forming rolls 30. The position of the wrapping material inlet opening 32 can be varied as long as it is located above the floor of the baling chamber 20 and the adjoining next lower bale-forming roll 30 rotates downward in the baling chamber. In place of this bale-forming device 18, that is particularly appropriate for a baling chamber 20 with a constant volume, a bale-forming device 18 could also be provided that includes elastic elements, pivoted bale-forming rolls, belts, chains, and the like with which the size of the baling chamber 20 can be configured as variable, as is also known practice. The requirement for the wrapping material inlet opening 32 and the harvested crop inlet opening 34 is not affected by this difference. The bale-forming device 18 is brought into rotation by means, not shown, for example, by articulated shafts, gearboxes, and chains, so that, among others, a bale-forming roll 30, arranged above the wrapping material inlet opening 32, rotates during the operation and is provided with a driven gear 36 (FIG. 2). Indeed, this driven gear 36 could also be provided on another driven component of the large round baler 10. In this embodiment, the drive of the bale-forming device 18 is performed in such a way that a bale 112 (FIG. 3) rotates in the baling chamber 20 according to the arrow reproduced there.

The baling chamber 20 may be of fixed or variable size and is used to accept the crop to be baled and to compress it. In the traditional manner, the baling chamber 20 is divided in the vertical direction into a forward and a rear half, with the forward rear halves connected to each other in an upper bearing 38, so that the rear half can be raised for the ejection of the bale 112.

The pick-up arrangement 22 takes up harvested crop that has been deposited in a swath on the ground and conducts it, if necessary, by means of the conveyor 24 through the harvested crop inlet opening 34 into the baling chamber 20.

The conveyor 24 may also be configured as a cutting arrangement and is available only selectively. It accepts the crop to be baled from the pick-up arrangement 22, reduces it if required, and conveys it into the baling chamber 20.

The wrapping arrangement 26 is known in itself for its type and is used to conduct wrapping material 40 into the baling chamber 20 for the finishing of a bale 112. The wrapping material is grasped by the circumferential surface of the rotating bale 112 and is carried along until it has enclosed the bale 112 and thereby has wrapped it. Accordingly, the wrapping arrangement 26 includes a carrier or support 42, if necessary, an independent supply or feed arrangement 44, a cutting arrangement 46, a contact force arrangement 48, and possibly a covering 50.

The wrapping material 40 is most often configured as a net, but may also be a foil, and is usually rolled up to form a wrapping material supply roll 52, as is the case here, for supplying material sufficient for wrapping a multitude of bales 112. In the embodiments according to FIGS. 1 through 7, the wrapping material 40 is approximately as wide as a bale 112 formed in the baling chamber 20; in the embodiments according to FIGS. 8 through 11, the wrapping material 40 is wider than the bale 112 and can also cover a part of the end face in addition to the circumference of the bale. A wrapping material 40, that is configured in particular as a net, is intended to be fed so that it is clamped between a rotating bale 112 and the inner side of the bale-forming roll 30, with the stems of the baled crop projecting into the net and aiding the pulling of the net from the supply supply roll 52 until the net is wrapped entirely around the bale 112.

In the embodiments according to FIGS. 1 through 3, 4, and 8 through 11, the carrier or support 42 is configured as a plane plate that is essentially horizontal and usually metallic that extends close to the supply or feed arrangement 44 on the side of the baling chamber and ends in a section bent upward on its side facing away from the baling chamber 20, which is used to secure the position of the wrapping material supply roll 52. It would also be possible to engage the core of the wrapping material supply roll 52 on an axle or shaft and to support it in bearings in a guide arrangement, free to rotate and slide. Normally the carrier or support 42 extends over the entire width of the baling chamber 20.

In this case, the supply or feed arrangement 44 includes a roll 54 whose diameter is less than that of a bale-forming roll 30 and is located in or at the wrapping material inlet opening 32. Although the drawing shows a separate roll 54, it would also be possible to use a bale-forming roll 30 to serve the purpose of the roll 54. If a roll 30 is used, it would bound the lower side of the wrapping material inlet opening 32 and would require that a brake arrangement for the wrapping material 40 be available. The roll 54 is provided with a drive gear 56 that is aligned with the driven gear 36 and is connected with it over an endless flexible drive element 58. The circumferential velocity of the roll 54 is always less than that of the bale 112, so that the wrapping material 40 is deposited under tension on the circumferential surface of the bale 112. The endless flexible drive element 58 is preferably a belt that can be brought into contact with the drive gear and the driven gear 36 and 56 by means of a tensioning roll 60 with adequate friction force. The roll 54 is provided with a high-friction coating or a profile that assures that the wrapping material 40 is securely conveyed to the wrapping material inlet opening 32.

The cutting arrangement 46 includes an anvil 62, a shear member 64, and an actuating arrangement 66, and is used to separate the wrapping material 40 after the wrapping process into a section located on the bale 112 and a section located on the wrapping material supply roll 52.

The anvil 62 extends over the entire width of the wrapping material 40 and is rigidly retained between the side walls 28. It provides a straight, sharp edge 68 on which the wrapping material 40 is clamped during the cutting process, and if necessary, brought to the point of tearing. Furthermore, a plate 126 is attached to the anvil 62 that encloses the cutting arrangement 46 towards the baling chamber 20, in that it essentially bridges the gap between the two adjoining bale-forming rolls 30 which define upper and lower bounds of the wrapping material inlet 32.

The shear member 64 includes a shear rail 70 that is preferably carried at each of its ends by an arm 72 and can be pivoted by means of the actuation arrangement 66 about a bearing 74. For the cutting process, the shear rail 70 is brought into contact with the anvil 62 so that the stretched wrapping material 40 tears off at its edge and the section connected with the wrapping material supply roll 52 is retained. The arm 72 extends beside the endless flexible drive element 58 and is provided with a retainer 76 for the tensioning roll 60, with the locations of the arm 72 and retainer 76 being such that the roll 54 is driven or is not driven as a function of the position of the shear rail 70. In a cutting position, the shear rail 70 is in contact with the anvil 62 and blocks the way for the wrapping material 40 (see FIG. 1). On the other hand, in a supply or charging position (see FIG. 2), an open passage is created between it and the anvil 62 through which the loose wrapping material 40 can pass whereby the loose wrapping material 40 can pass through the inlet 32 and reach the baling chamber 20 on the basis of the force of gravity and the rotating roll 54.

The actuation arrangement 66 can be configured as desired, for example, mechanically, electrically, hydraulically or pneumatically, and is provided in order to bring the shear rail 70, and with it also the tensioning roll 60, into a supply position or a cutting position. The control can be performed manually or automatically as a function of the supply of crop to be baled.

The contact force arrangement 48 includes an arm 78, a pressure roll 80, and a force member 82, that are located according to FIGS. 1 through 4, and 8 through 11 centrally on the side of the carrier or support 42, facing away from the baling chamber 20, which however, is not mandatory. The contact force arrangement 48 is required to bring the wrapping material 40 or the wrapping material supply roll 52 into frictional contact, that is, in friction force contact, with the roll 54, and to retain it there during the operation so that the roll 54 conveys the wrapping material 40 securely on the one hand, and on the other hand, applies the necessary braking force.

The arm 78 is mounted for pivoting vertically about a horizontal bearing axis defined by a bearing 84 fixed to one end of the arm 78. The bearing 84 is located slightly below the level of the carrier or support 42 in the vicinity of the upward bend, but need not be so located. The arm 78 may be configured as a bent plate as well as one or more pivot arms and has the shape of an angle lever in the embodiments, according to FIGS. 1 through 3, 4, and 8 through 11.

At its other end, the arm 78 carries the pressure roll 80, free to rotate or carries it rigidly. The arm 78 and the attachment of the pressure roll 80 are here selected in such a way that the pressure roll 80 is in contact with the circumferential surface of the wrapping material supply roll 52 in every position of the arm 78 essentially diametrically opposite the roll 54.

The force member 82, that can also be characterized as a pressure member or tensioning member, has a lower end attached to the arm 78 in a joint located between the bearing 84 and the pressure roll 80, and has its upper end coupled directly on the chassis 12, or in this embodiment, with the covering 50 that is in turn, connected to the chassis 12. The force member 82 may be configured as a mechanical spring, a gas spring or the like in order to maintain the contact force of the pressure roll 80 on the circumferential surface of the wrapping material supply roll 52. The force member 82 is configured in such a way that it can be shortened against the effect of a force.

The covering 50 is configured, for example, as a sheet metal hood and is supported in a bearing 86, free to pivot vertically at a location close to the bale-forming roll 32, which delimits the upper side of the wrapping material inlet opening 32. The covering 50 is so large that it covers the carrier or support 42, the supply or feed arrangement 44, the cutting arrangement 46, and the contact force arrangement 48, and protects them from dirt and weather influences. An arm 88 extends from the underside of the covering 50 at an end region remote from the bearing 86, and has its free lower end region 90 pivotally coupled to the upper end of the force member 82. In a closed position of the covering 50, shown in FIG. 1, the bearing 84 is located underneath, and the pressure roll 80 is located above, a straight line connecting the bearing 86 with the free end region 90 so that the covering 50 is always forced downward as well as the pressure roll is forced against the wrapping material supply roll 52 since the force member 82 endeavors to expand, which however, is no longer possible after a dead center position has been passed.

The wrapping material supply roll 52 accepts several hundred meters of wrapping material 40, and during operation, decreases steadily in diameter. The configuration of the carrier or support 42, as well as the contact of the pressure roll 80 under the pressure of the force member 82, has the result that the wrapping material supply roll 52 is always in contact with the roll 54. The position of the wrapping material supply roll 52 relative to the roll 54 regularly assures that the wrapping material 40 wraps itself around the roll 54 through a wrapping angle of approximately 180º. This wrapping angle can be reduced or increased by the corresponding selection of profile or coating.

On the basis of the above description, the result is the following operation of the wrapping arrangement 26.

For the beginning of the operation, the covering 50 is brought into the position shown in FIG. 2, that is, it is raised so that the pressure roll 80 moves away from the supply or feed arrangement 44 and is raised, if necessary, from the wrapping material supply roll 52 or from its core. The cutting arrangement 46 is actuated so that there is no free access through the wrapping material inlet opening 32. Following this, an enclosed wrapping material supply roll 52 is laid upon the carrier or support 42 from the side or from the front, an end section of the wrapping material 40 drawn away from it, laid over the roll 54 and drawn approximately until it makes contact with the shear rail 70. Thereby, the position of the wrapping material supply roll 52 is selected in such a way that the wrapping material 40 is drawn from the lower side of the wrapping material supply roll 52 that is in frictional contact with the carrier or support 42. Then, the wrapping material supply roll 52 is rolled up to the roll 54 and the covering 50 is lowered so that the pressure roll 80 is brought into contact with the circumferential surface of the wrapping material supply roll 52 and forces it into contact with the roll 54. During the downward movement of the covering 50, the force member 82 will cross a dead center position, and following that, assume a position in which it biases the covering 50 in the direction of the carrier or support 42, and thereby always keeps it closed since the force member 82 is supported at its other end on the wrapping material supply roll 52. During the baling operation, the tensioning roll 60 is not forced against the endless flexible drive element 58, and hence the supply or feed arrangement 44 is not driven; the wrapping material 40 thereby remains in the previous position. As soon as the baling operation is ended, the shear rail 70 is retracted from the actuating arrangement 66, and thereby the tensioning roll 60 is forced against the endless flexible drive element 58 so that the roll 54 is brought into rotation. The roll 54 then draws the wrapping material 40 from the wrapping material supply roll 52 so that it can fall directly vertically downward from the roll 54 through the wrapping material inlet opening 32 and reach the baling chamber 20. As soon as the wrapping process is concluded, the actuating arrangement 66 forces the shear rail 70 against the anvil 62 and thereby holds the wrapping material 40 fast along the edge 68 so that it tears on the basis of the tension force that continues to be exerted by the rotating bale 112. In this condition, the rotation of the roll 54 is interrupted because the tensioning roll 60 was raised. The remaining wrapping material 40 thereby again resumes its previous position.

Figure 3:
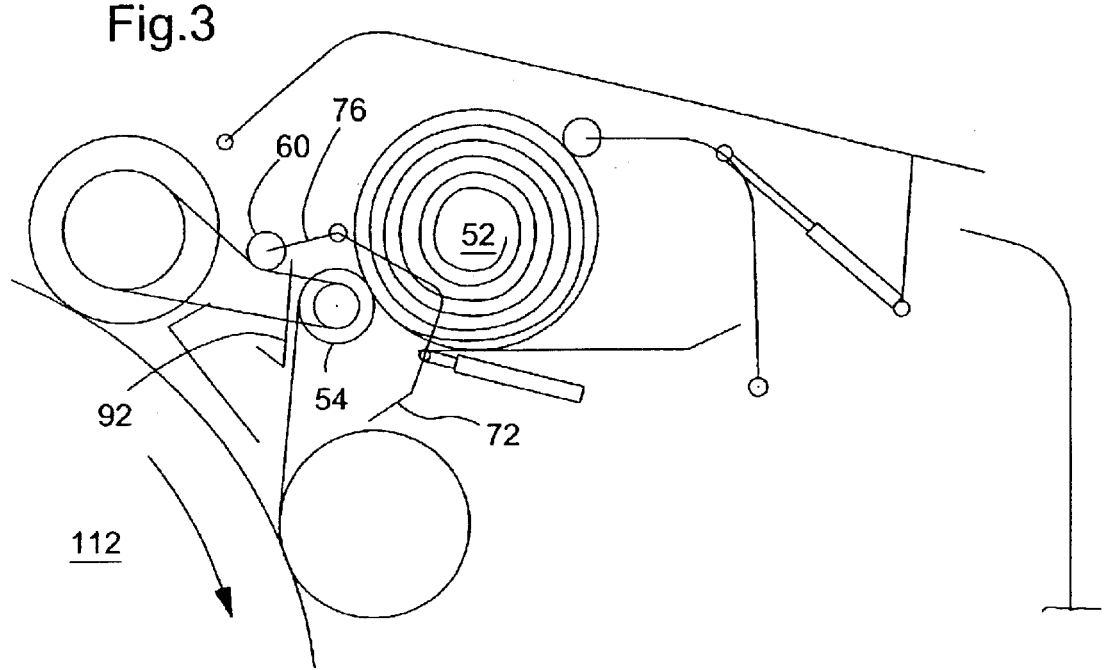
FIG. 3 shows a wrapping arrangement, constructed according to a second embodiment, including a guide vane and a modified cutting arrangement.

The embodiment, according to FIG. 3, differs from the previous embodiment by a guide vane 92 that is located on the side of the roll 54 opposite the wrapping material supply roll 52 that ends in its underside in the edge 68, which however, is not mandatory and whose upper end region extends slightly beyond the roll 54. A further difference from the first embodiment lies in the fact that the retainer 76 for the tensioning roll 60 represents an extension of the arms 72, instead of a branch. The operation and the remaining configuration of the wrapping arrangement 26 are identical to that of the previous embodiment.

Figure 3A:
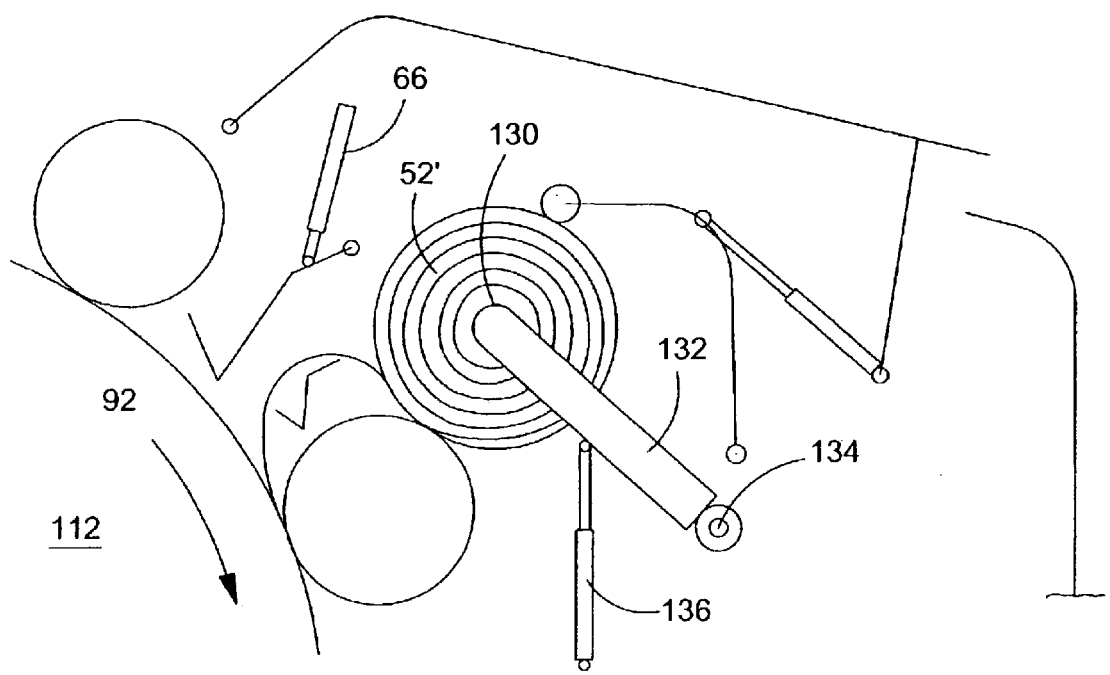
FIG. 3a shows a wrapping arrangement, constructed according to a third embodiment, wherein one of the bale-forming rolls is used as a feed roll for the wrapping material.

The third embodiment, according to FIG. 3a, shows the wrapping material supply roll 52' of a type including a central core 130 having opposite ends respectively rotatably mounted to first ends of an arm assembly including a pair of transversely spaced arms 132 having their other ends pivotally mounted, as at 134, to the opposite side walls of the baling chamber. A pair of extensible and retractable hydraulic actuators 136 are coupled between the side walls and the arm assembly for pivoting the latter vertically between a wrap material dispensing position, wherein the supply roll 52' is engaged with the bale forming roll 30, at the lower side of the wrapping material inlet 32, such that the rotating roll 30 imparts rotation to the supply roll 52' and causes the wrapping material 40 to be fed into the baling chamber. Braking of the rotation of the roll 52' and selective separation of the wrapping material 40, once a bale is wrapped, is accomplished in substantially the same manner as described above.

Figure 4:
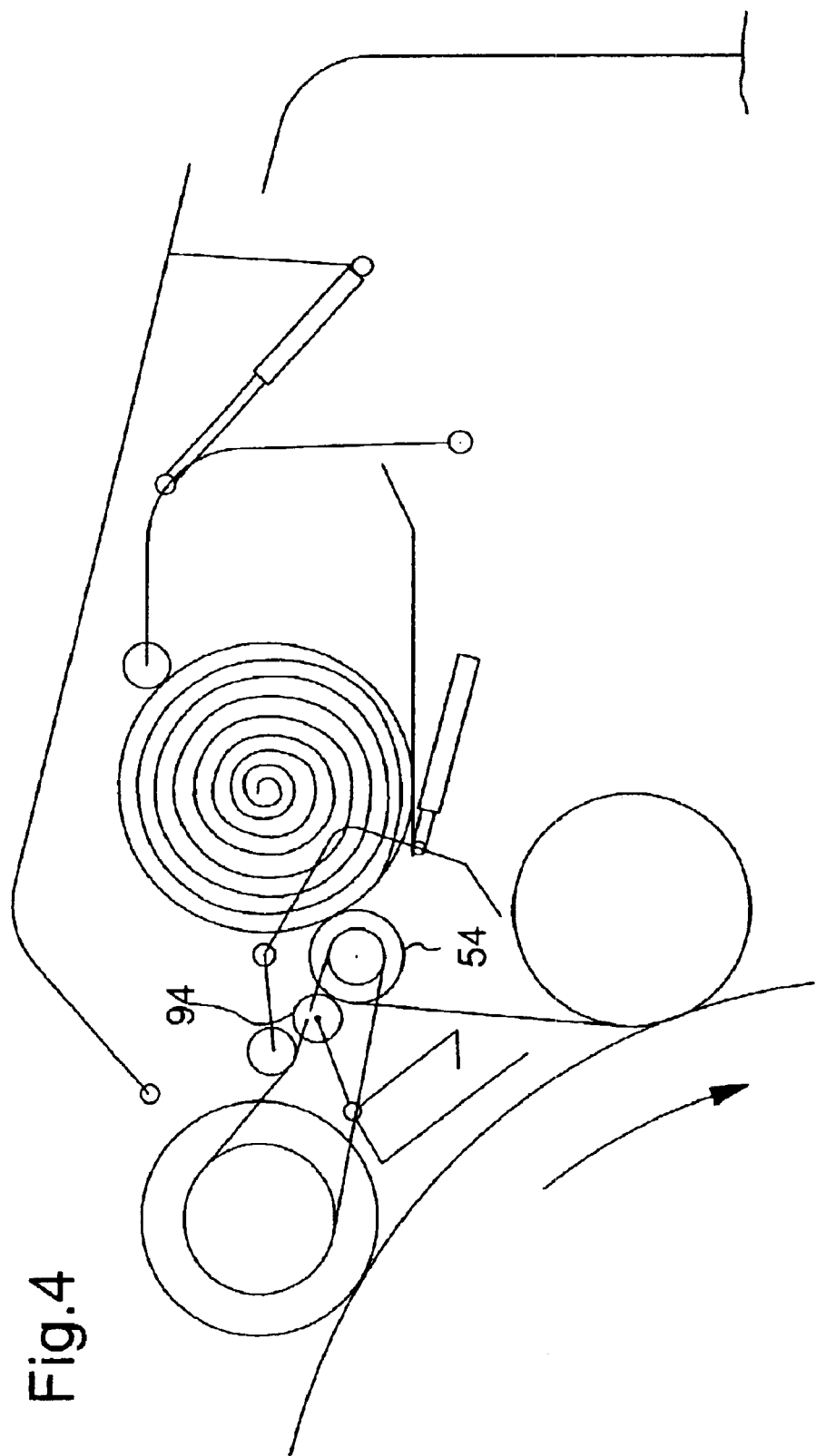
FIG. 4 shows a wrapping arrangement, constructed according to a fourth embodiment, including a guide roll and the modified cutting arrangement according to FIG. 3.

The fourth embodiment according to FIG. 4 corresponds generally to that of FIG. 3 where, however, the guide vane 92 is replaced by a guide roll 94 that is provided without drive at a small spacing from, and parallel to, the roll 54 and thereby holds the wrapping material 40 in contact with the roll 54.

Figure 5:
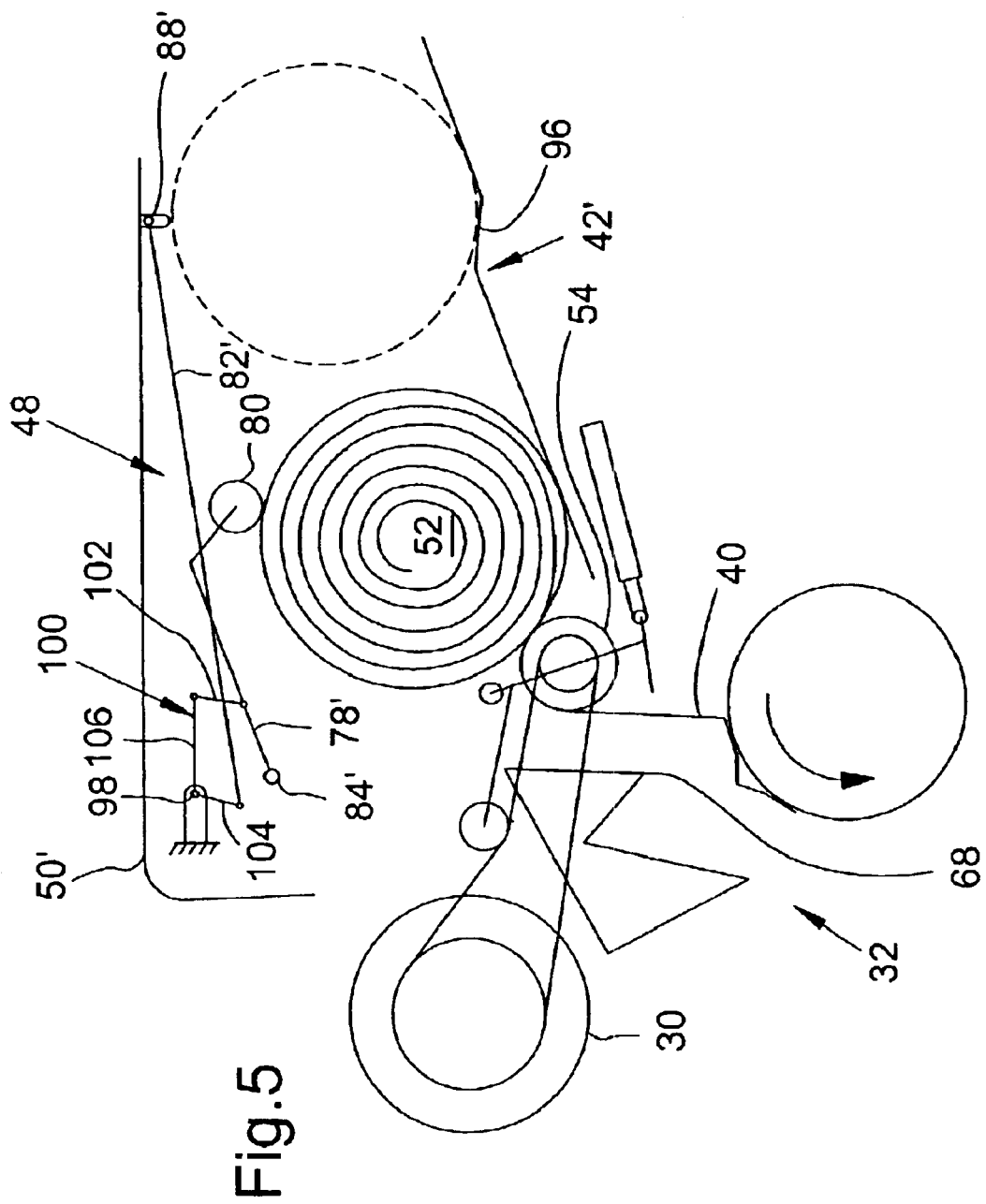
FIG. 5 shows a wrapping arrangement, constructed according to a fifth embodiment, including a possible support arrangement for two wrapping material rolls in a slightly inclined disposition.
Figure 9:
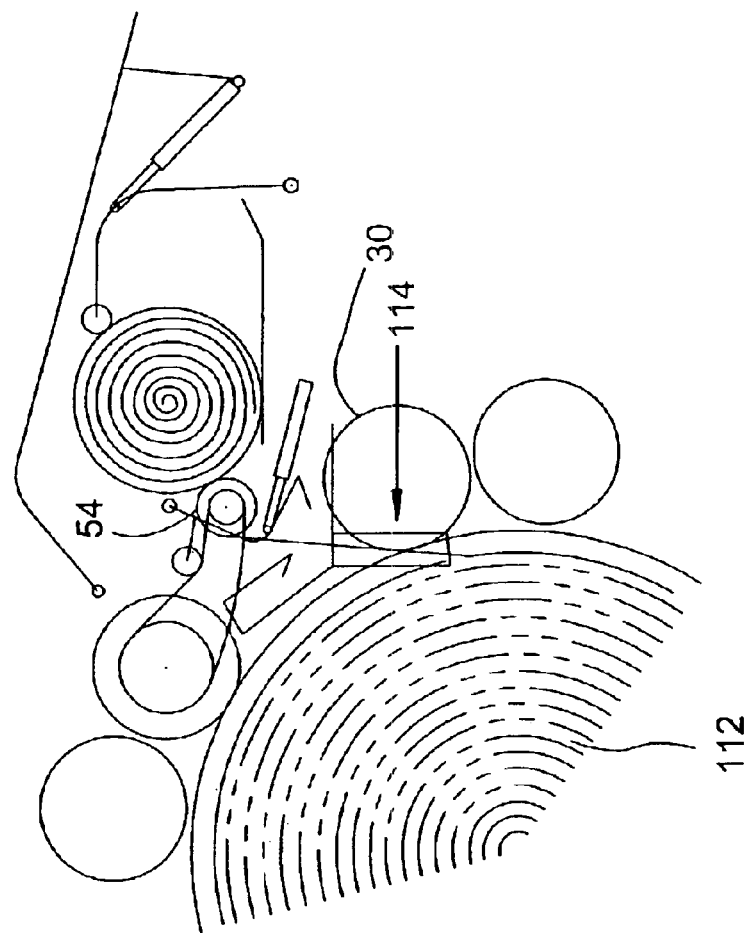
FIG. 9 is a side view of the wrapping arrangement of FIG. 8.
Figure 8:
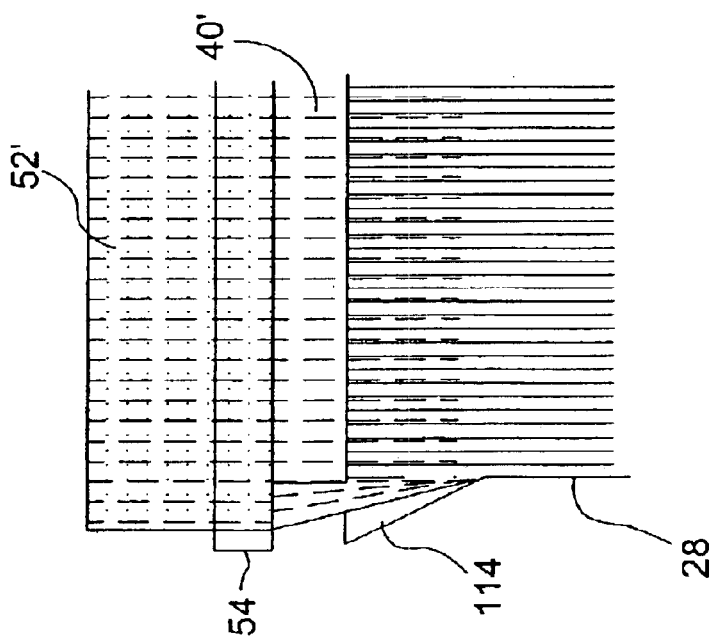
FIG. 8 is a front view of a wrapping arrangement of FIG. 1, for a wrapping material that is wider than a cylindrical bale produced in the large round bale, and including a guide arrangement for the wrapping material.
Figure 11:
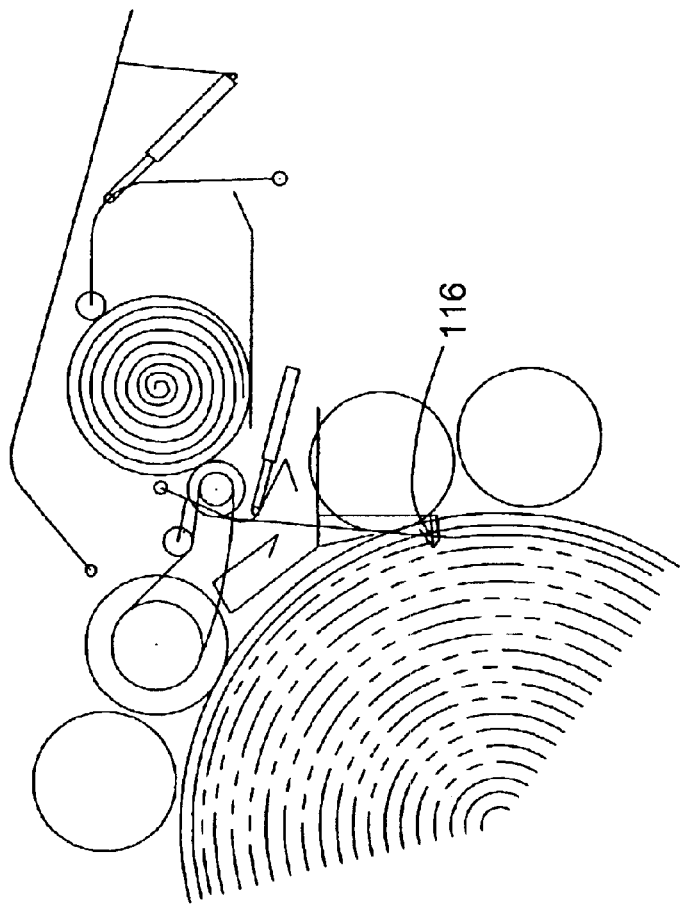
FIG. 11 is a side view of the wrapping arrangement of FIG. 10.
Figure 10:
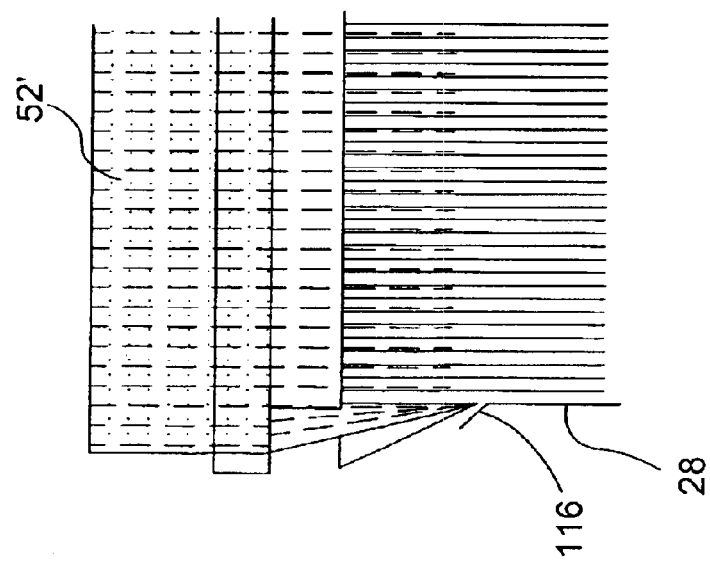
FIG. 10 is view similar to that of FIG. 8, but showing a slot in a side wall of the baling chamber next to the guide arrangement.

The fifth embodiment, according to FIG. 5, shows differences regarding the carrier or support 42 and the contact force arrangement 48. The carrier or support 42' is provided with a step 96 and configured with such a length that two wrapping material rolls 52 can be deposited on it, in particular, one to each side of the step 96. The carrier or support 42' is provided with a slight downward gradient towards the wrapping material inlet opening 32, and the step 96 is used as a stop for the second wrapping material supply roll 52 that is provided as a supply. The contact force arrangement 48' is based on the same principle as that of the previous embodiments, that is, a pressure roll 80 that is attached to an arm 78' is forced against the wrapping material supply roll 52 by means of a force member 82' supported on the covering 50; however, it is attached to the inside of the covering 50 in such a way that when the covering 50 is raised, all associated components are raised along with it and the wrapping material roll or rolls 52 can be loaded not only from the side but also from the front. The arm 78' is again supported in bearings, free to pivot vertically, about a bearing 84' on the chassis 12 or the side walls 28, where the bearing 84' is located in the region between the wrapping material supply roll 52 and the bale-forming roll 30 located above the wrapping material inlet opening 32. The pressure roll 80 or pressure rod attached to the free end of the arm 78' presses in the same position as before against the wrapping material supply roll 52. The force member 82' is fastened at its one end with the arm 88' on the inside of the covering 50, in particular, in the region of the second wrapping material supply roll 52. Deviating from the previous embodiments, a bearing 98, a deflecting lever 100, and a steering arm 102 are provided. The bearing 98 has a pivot axis that is essentially horizontal, it is fastened to the side walls 28 or the chassis 12 and is located above the bearing 84' within the space enclosed by the covering 50'. The deflecting lever 100 is configured with two arms and engages the bearing 98 in such a way that it can pivot in the vertical direction. One or more deflecting levers 100 may be provided. The other end region of the force member 82' that is still free is connected in a joint to a free end of a leg 104 that extends generally in the upright direction in the closed position of the covering 50 and in the embodiment according to FIG. 5. The end region of the leg 104, that engages the bearing 98, is connected rigidly to a leg 106 at an angle of approximately 90°, which engages the steering arm 102 in its free end region in a joint. The steering arm 102 that may be a component that can transmit force in two directions, such as a rigid rod, is connected with its other end region to the arm 78, free to pivot, and extends in the position shown in FIG. 5 nearly parallel to the leg 104. The configuration of this contact force arrangement 48' has the result that the force member 82' and the arm 78' always pivot in the same direction, so that the wrapping material supply roll 52 is freed when the covering 50' is opened or is raised. Finally, in this embodiment, the roll 54 is no longer located inside the circle described by the outer sides of the bale-forming rolls 30, but now is only bordering on these. Indeed, the spacing is selected in such a way that the wrapping material 40 drawn from the roll 54 falls upon the bale-forming roll 30 located underneath the wrapping material inlet opening 32 and is carried along by it into the baling chamber 20. In this way, there is still no need, as before, for any additional conveying elements in order to bring the wrapping. material 40 into the baling chamber 20.

The sixth embodiment, according to FIG. 6, corresponds generally to that according to FIG. 5, particularly as far as the carrier or support 42' and the contact force arrangement 48' is concerned. However, the carrier or support 42' no longer extends at an angle, but horizontally. The essential difference lies in the fact that the bale-forming device 18 located underneath the wrapping material inlet opening 32 is configured not as a bale-forming roll, but as an endless flexible element 108, for example, as a belt, chain, band or the like, that extends over two deflecting pulleys 110. In this case, the wrapping material 40 also falls onto the bale-forming device 18 downstream of the roll 54 and is conveyed by the bale-forming device into the baling chamber 20. As in all previous embodiments, the wrapping material supply roll 52 is in contact with the roll 54 on which the wrapping material 40 lies, is carried along, and is enclosed in the downward direction.

The seventh embodiment, according to FIG. 7, corresponds essentially to that of FIG. 6, where however, the carrier or support 42', the contact force arrangement 48' and the covering 50 are oriented vertically, and the wrapping material supply roll 52 now lies upon the roll 54.

The embodiments according to FIGS. 8 through 13 originate generally from the embodiments according to FIGS. 1 and 2, where however, a wrapping material 40' with the associated wrapping material supply roll 52' were selected that are wider than the baling chamber 20 or the bale 112 produced in it. The advantage of such an excessively wide wrapping material 40' lies in the fact that the corners and a minor part of the end faces of the bale 112 can be covered, which reduces the effect of the weather. Also, during the wrapping with foil for purposes of silage, the wide wrapping material brings about lower air influences and applies less mechanical strain to the foil. In order to guide the wrapping material 40' to the end faces of the bale 112, according to FIGS. 8 and 9, guide vanes 114 are provided; according to FIGS. 10 and 11, slots 116 are provided; according to FIG. 12, a deflector 118 is provided; and according to FIG. 13, an inlet channel 120 is provided, in each case at or in the side walls 28 over which or through which the side regions of the wrapping material 40' reach the baling chamber 20 and the wrapping material 40' is gathered together to a smaller width.

The guide vanes 114 are surfaces angled to the outside from the side walls 28 that are, for example, sheet metal, that extend from the widest expanse of the wrapping material 40' up to the side walls 28 at an angle of up to approximately 15° to 45°. The guide vanes 114 begin downstream of the wrapping material inlet opening 32 and extend further downstream to approximately the bale-forming roll 30 that is downstream from the wrapping material inlet opening 32.

The slots 116 are formed by small cuts in the side walls 28 extending approximately radially from the center of the baling chamber 20, where the rim region of the side wall 28 following each of the slots downstream, is bent outward in order to avoid a sharp edge that could damage the wrapping material 40'.

The deflector 118 is configured as a plate that is attached to the inner side of each side wall 28 upstream of the entry point of the wrapping material 40' and is provided with a thickness that is slightly greater than that of the wrapping material 40'. The thickness of the deflector 118 may be configured as increasing steadily. In the embodiment shown, the deflector 118 is configured as an isosceles triangle, whose one leg 122 is immediately adjacent to the anvil 62, while a second leg 124 extends along the line of supply of the wrapping material 40'. The second leg 124 begins at the circumference of the bale 112 and extends at least so far along the end face of the bale 112 as the wrapping material 40' is to cover the end face. Thereby, the deflector 118 presses the bale 112 away from the inner side of the side walls 28 in the entry region of the wrapping material 40' and forms a free space or gap in which the part of the wrapping material 40' projecting beyond the width of the bale 112 can enter and be deposited on the end face of the bale 112, as can be seen in FIG. 12a. Accordingly, no opening is required in the side wall 28 in this case in order to bring the projecting section of the wrapping material 40' into the baling chamber 20.

Figure 13:
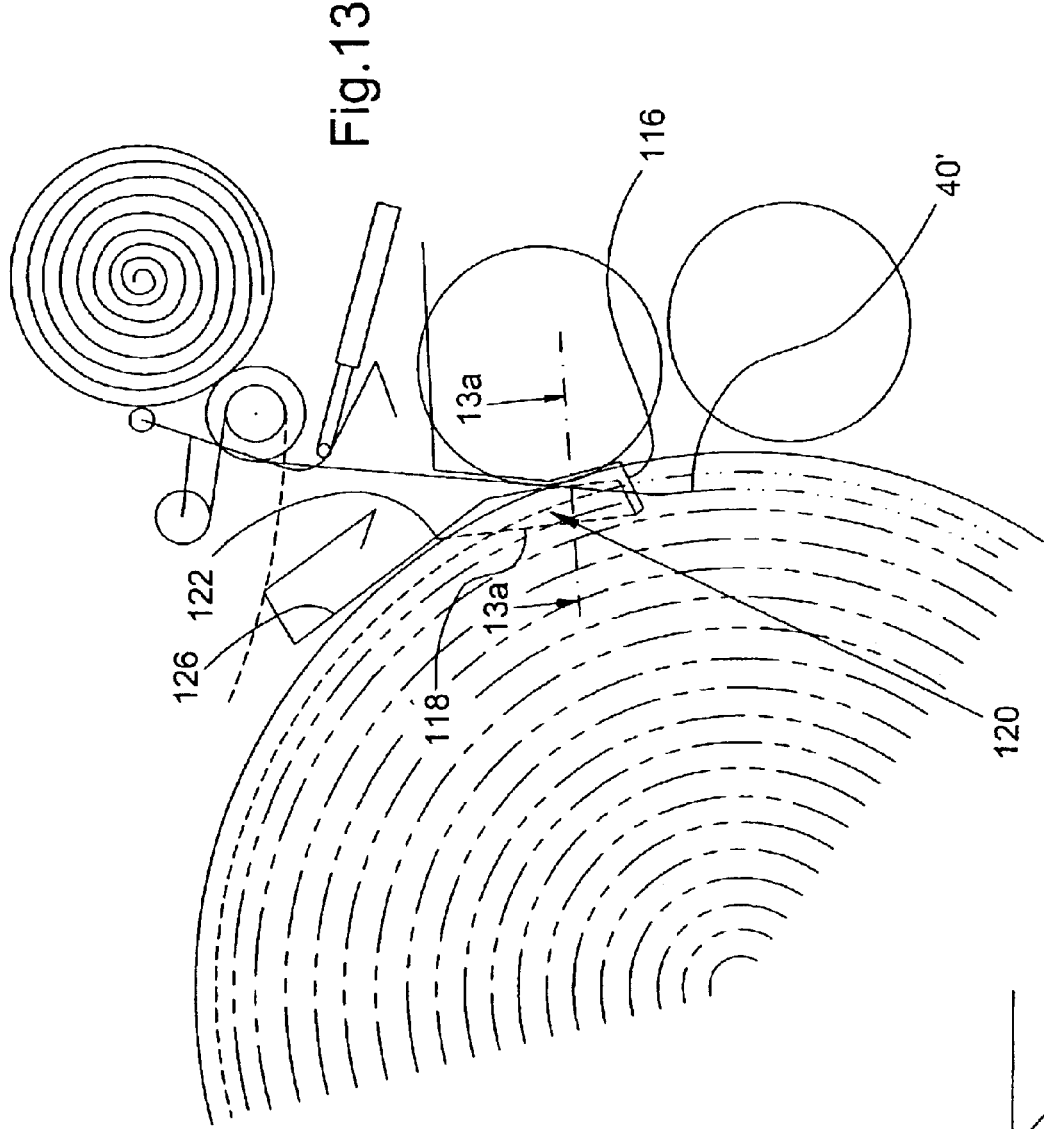
FIG. 13 is a side view of the wrapping arrangement according to FIG. 1 constructed for delivering a wrapping material that is wider than a bale produced in the large round baler, and including an inlet channel formed in the baling chamber side wall for receiving the wrapping material.
Figure 13A:
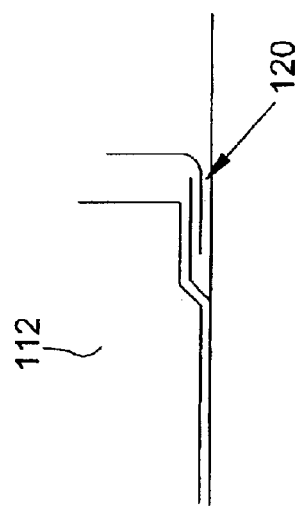
FIG. 13a is horizontal sectional view taken along line 13a–13a of FIG. 13.

The embodiment, according to FIG. 13, is also provided with a deflector 118' that, nevertheless, is not in contact with the surface of the inner side of the side wall 28, but maintains a slight distance to it, which forms the inlet channel 120. The deflector 118' may generally have the same shape and be attached at the same location as the deflector 118. Nevertheless, the edge region of the wrapping material 40', extending beyond the baling chamber 20, is again conducted through a generally radial slot 116 in the side walls 28 to the end faces of the bale 112.

Having described the preferred embodiment, it will become apparent that various modifications can be made without departing from the scope of the invention as defined in the accompanying claims.

What is claimed is:

1. In a large round baler including a baling chamber defined by at least in part by a bale-forming device that surrounds the circumference of the baling chamber and defines a wrapping material inlet at a location spaced above a floor of the baling chamber, and a wrapping arrangement, the improvement comprising: said wrapping arrangement including a feed roll that can be driven and is located adjacent the wrapping material inlet a wrapping material supply roll carrying wrapping material and being selectively movably mounted for frictional contact with said feed roll; and said feed roll being a sole feed roll for pulling wrapping material off said supply roll and being so located relative to said wrapping material inlet that wrapping material pulled off said supply roll by said feed roll will gravitate through said wrapping material inlet.

2. The large round baler, as defined in claim 1, wherein said feed roll is a bale-forming roll; said wrapping material supply roll being mounted for movement between a stand-by position, wherein it is separated from said feed roll and a feed position wherein it is engaged with said feed roll; a power device coupled for moving said material supply roll between said stand-by position and said feed position; and a braking device mounted for selectively applying a braking force to said supply roll of wrapping material.

3. The large round baler, as defined in claim 2, wherein said braking device includes a pressure roll mounted for engaging said wrapping material supply roll at a location substantially diametrically opposite from said feed roll; and a force-exerting device being coupled for applying a force to said pressure roll which acts along a line passing through said feed roll.

4. The large round baler, as defined in claim 3, wherein said wrapping arrangement further includes a covering extending over said wrapping material supply roll and movable between open and closed positions; and said force-exerting device being pivotally connected to said covering.

5. The large round baler, as defined in claim 4, wherein a linkage is connected between said force-exerting device and said pressure roll; and said force-exerting device has an end coupled to said covering.

6. The large round baler, as defined in claim 5, wherein said covering is mounted for swinging about a first pivot point, said linkage is mounted for swinging about a second pivot point and said force exerting device is coupled between third and fourth connection points respectively located on said cover and linkage; and said force exerting device having a line of action extending between said third and fourth connection points and oriented, when said covering is in its open position, so as to bias said covering upwardly about said first pivot point and away from said wrapping material supply roll while at the same time biasing said linkage away from said wrapping material supply roll about said second pivot point, and with said line of action being oriented, when said covering is in its closed position, so as to bias said covering downward about said first pivot point and to bias said linkage toward said wrapping material supply roll about said second pivot point.

7. The large round baler, as defined in claim 2, wherein said wrapping material supply roll is so located relative to said feed roll that said wrapping material engages said feed roll essentially over 180° degrees of arc.

8. The large round baler, as defined in claim 1, wherein said feed roll is configured separately from said bale-forming device; said bale-forming device including a rotatable element; and a drive arrangement being coupled between said rotatable element and said feed roll.

9. The large round baler, as defined in claim 8, wherein said wrapping arrangement further includes a guide vane located in said wrapping material inlet and positioned so as to guide the wrapping material in or through the wrapping material inlet.

10. The large round baler, as defined in claim 8, wherein said wrapping arrangement further includes a cutting arrangement for the wrapping material mounted between said feed roll and said wrapping material inlet.

11. The large round baler, as defined in claim 8, wherein said wrapping arrangement is configured wider than said baling chamber; and one of guide vanes or slots being provided at, or in, opposite side walls of said baling chamber at locations downstream of said feed roll, whereby said wrapping material is conducted to opposite end faces of a bale located in said baling chamber.

12. The large round baler, as defined in claim 8, wherein said wrapping arrangement is configured wider than said baling chamber; and said wrapping arrangement further including a deflector provided upstream of an entry point of said wrapping material into said baling chamber on an inner side of each of opposite side walls of said baling chamber.

13. The large round baler, as defined in claim 12, wherein each of said defectors is spaced at a distance from, and forms an inlet channel together with, an associated side wall of said baling chamber for entry of a part of said wrapping material.

14. The large round baler, as defined in claim 1, wherein said wrapping arrangement further includes a carrier having a surface supporting said supply roll of wrapping material; and a braking device biasing said supply roll of wrapping material into frictional contact with said surface of said carrier.

* * * * *